United States Patent
Heo et al.

(10) Patent No.: US 10,473,293 B2
(45) Date of Patent: Nov. 12, 2019

(54) REFLECTIVE SHEET AND METHOD OF MANUFACTURING THE SAME

(71) Applicant: LG Display Co., Ltd., Seoul (KR)

(72) Inventors: Kang Heo, Goyang-si (KR); Yong Yun Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 170 days.

(21) Appl. No.: 14/540,178

(22) Filed: Nov. 13, 2014

(65) Prior Publication Data
US 2015/0146436 A1 May 28, 2015

(30) Foreign Application Priority Data
Nov. 26, 2013 (KR) .................. 10-2013-0144780

(51) Int. Cl.
*F21V 7/09* (2006.01)
*G02F 1/1335* (2006.01)

(52) U.S. Cl.
CPC .......... *F21V 7/09* (2013.01); *G02F 1/133605* (2013.01); *G02F 1/133611* (2013.01); *G02F 1/133603* (2013.01); *Y10T 29/49* (2015.01)

(58) Field of Classification Search
CPC ................. F21V 7/09; G02F 1/133603; G02F 1/133605; G02F 1/133611
See application file for complete search history.

(56) References Cited

U.S. PATENT DOCUMENTS

2008/0285164 A1* 11/2008 Nousou .................. F21V 7/10
359/838
2011/0305004 A1 12/2011 Kim et al.
2012/0069248 A1* 3/2012 Yokota .............. G02F 1/133605
348/739

(Continued)

FOREIGN PATENT DOCUMENTS

| CN | 1570724 A | 1/2005 |
|---|---|---|
| CN | 102449376 A | 5/2012 |
| CN | 103047609 A | 4/2013 |

(Continued)

OTHER PUBLICATIONS

First Office Action dated Jul. 5, 2016 from The State Intellectual Property Office of People's Republic of China in counterpart Chinese application No. 201410696961.0.

(Continued)

*Primary Examiner* — Anh T Mai
*Assistant Examiner* — Nathaniel J Lee
(74) *Attorney, Agent, or Firm* — Morgan, Lewis & Bockius LLP

(57) ABSTRACT

A reflective sheet with a dot-cut pattern for preventing both bright line and bright spot, and a method of manufacturing the same, is provided. The reflective sheet and method of manufacturing the same may be capable of reducing a manufacturing cost and also improving a manufacturing efficiency. The reflective sheet may include a bottom part including a hole for exposing a light source, the bottom part provided on a bottom surface of a cover bottom; a lateral (Continued)

part extending from the bottom part, the lateral part provided at a lateral surface of the cover bottom; a half-cut pattern formed in the boundary between the bottom part and the lateral part; and a plurality of dot-cut patterns formed at the lateral part.

10 Claims, 7 Drawing Sheets

(56) References Cited

U.S. PATENT DOCUMENTS

| | | | | |
|---|---|---|---|---|
| 2012/0133689 A1* | 5/2012 | Kwong | ............ | G02F 1/133605 |
| | | | | 345/690 |
| 2014/0211121 A1* | 7/2014 | Cho | ................. | G02F 1/133603 |
| | | | | 349/58 |

FOREIGN PATENT DOCUMENTS

| | | | |
|---|---|---|---|
| KR | 10-2006-0134021 A | 12/2006 | |
| KR | 10-2012-0046470 A | 5/2012 | |
| KR | 101282029 B1 * | 7/2013 | ....... G02F 1/133603 |
| WO | 2010/146892 A1 | 12/2010 | |

OTHER PUBLICATIONS

Office Action dated Sep. 20, 2019, from Korean Patent Office in counterpart Korean application No. 10-2013-0144780.

* cited by examiner

REFLECTIVE SHEET AND METHOD OF MANUFACTURING THE SAME

CROSS REFERENCE TO RELATED APPLICATIONS

This application claims the benefit of Korean Patent Application No. 10-2013-0144780 filed on Nov. 26, 2013, which is hereby incorporated by reference as if fully set forth herein.

BACKGROUND OF THE INVENTION

Field of the Disclosure

The present disclosure relates to a reflective sheet with a dot-cut pattern for preventing both bright line and bright spot, which is capable of reducing a manufacturing cost and also improving a manufacturing efficiency, and a method of manufacturing the same.

Discussion of the Related Art

With the development of various kinds of mobile electronic equipment such as mobile terminal and notebook computer and a large-sized television, there is an increasing demand on flat panel display devices which are applied thereto.

The flat panel display devices may include a liquid crystal display device (LCD), a plasma display panel (PDP), a field emission display device (FED), an organic light emitting diode display device, and etc.

Among the various flat panel display devices, the LCD device has been widely used in various fields of monitors used for industrial terminal, notebook computer, video game machine, and etc.; mobile terminals such as mobile phone, MP3, PDA, PMP, PSP, mobile game machine, DMB receiver, and etc.; and electric home appliances such as refrigerator, microwave oven, washing machine, and etc. owing to development of mass production technology, easiness of driving means, high resolution, low power consumption and realization of large size.

The LCD device may include a thin film transistor (TFT) formed in each of pixels arranged in a matrix configuration, wherein a light transmittance may be controlled by a video signal applied to each pixel, to thereby display an image.

The LCD device may include a liquid crystal panel, a backlight unit for supplying light to the liquid crystal panel, and a driving circuit, wherein the liquid crystal panel may include a lower substrate, an upper substrate, and a liquid crystal layer formed between the lower and upper substrates.

The liquid crystal panel cannot emit light in itself. Thus, the liquid crystal panel inevitably requires a light source for supplying the light. That is, the backlight unit is provided at a lateral side or rear side of the liquid crystal panel, whereby the light emitted from the backlight unit is supplied to the liquid crystal panel.

FIG. 1 illustrates an LCD device including a reflective sheet according to the related art.

As shown in FIG. 1, the LCD device may include a liquid crystal panel 60 provided with a plurality of liquid crystal cells arranged in a matrix configuration so as to display an image; a backlight unit for supplying light to the liquid crystal panel 60; a cover bottom 10 for receiving the backlight unit therein; a top case (not shown); and a driving circuit (not shown) for driving the liquid crystal panel 60 and a light source of the backlight unit.

The liquid crystal panel 60 may include a lower substrate 62, an upper substrate 64, and a liquid crystal layer 66, wherein the liquid crystal layer 66 is interposed between the lower and upper substrates 62 and 64 bonded to each other. The liquid crystal panel 60 cannot emit light in itself, whereby the liquid crystal panel 60 needs the light source. In this case, the light emitted from the backlight unit including the light source positioned at a rear surface of the liquid crystal panel 60 is supplied to the liquid crystal panel 60. FIG. 1 shows a direct-type backlight unit in which a light source of light emitting diode (LED) 20 is used.

To improve picture quality of the image displayed on the display panel 60, there are many factors that need to be considered. One of the most important factors is to uniformly maintain luminance of the light emitted to the liquid crystal panel 60. That is, the uniform luminance of light supplied to the liquid crystal panel 60 enables to realize the good picture quality of image.

To this end, the backlight unit may include a plurality of LEDs 20, a diffusion plate 40, a plurality of optical sheets 50, and a reflective sheet 30.

On the bottom of the cover bottom 10, there are the plurality of LEDs 20 provided in an array type. The plurality of optical sheets 50 are provided on the diffusion plate 40. The plurality of optical sheets 50 may include a diffuser sheet, a prism sheet, and a reflective polarizing film (DBEF, dual brightness enhancement film).

FIG. 2 illustrates an ink pattern formed at a lateral side of the reflective sheet according to the related art. FIG. 3 illustrates a method of manufacturing the reflective sheet shown in FIG. 1 according to the related art.

As shown in FIGS. 2 and 3, the reflective sheet 30 may include a first surface (bottom surface) 32 provided on the bottom of the cover bottom 10, and a second surface (lateral surface) 34 provided at a lateral side of the cover bottom 10. The first surface 32 of the reflective sheet 30 is provided with a hole 38 for exposing the LED 20 therethrough. The reflective sheet 30 is attached to the bottom and lateral surfaces of the cover bottom 10 so as to reflect the light generated in the LED 20 toward the liquid crystal panel 60.

To prevent both bright line and bright spot of the light generated in the LED 20, a dot pattern of grey-colored or black-colored ink is printed on the second surface 34 of the reflective sheet 30, that is, the lateral surface of the reflective sheet 30 so that it is possible to realize uniform luminance of the light reflected on the lateral surface of the cover bottom 10. In this case, the reflective sheet 30 is provided with a half-cut pattern 39 which enables to arrange the reflective sheet 30 along the profile of lateral surface of bottom surface of the cover bottom 10.

A method of manufacturing the reflective sheet 30 according to the related art will be described as follows.

First, the hole 38 for exposing the LED 20 and the half-cut pattern 39 for making the reflective sheet 30 bent along the profile of the cover bottom 10 are formed for a first manufacturing process.

Then, for a second manufacturing process, the dot pattern 34 is printed on the lateral surface of the reflective sheet 30 so as to overcome the problems related with the bright line and bright spot which might occur in the direct-type backlight unit.

The above two manufacturing processes are carried out to manufacture the reflective sheet 30, which causes the lowering of manufacturing efficiency and the increase of manufacturing cost.

SUMMARY OF THE INVENTION

Accordingly, the present invention is directed to a reflective sheet and a method of manufacturing the same that substantially obviates one or more problems due to limitations and disadvantages of the related art.

An object of the present invention is to provide a reflective sheet which is capable of supplying light with uniform luminance to a liquid crystal panel, and a backlight unit using the same.

Another object of the present invention is to provide a reflective sheet which is capable of improving good picture quality of image displayed on a liquid crystal display device, and a backlight unit using the same.

Another object of the present invention is to provide a reflective sheet which is capable of reducing a manufacturing cost of a liquid crystal display device, and a backlight unit using the same.

A further object of the present invention is to provide a reflective sheet which enables to improve a manufacturing efficiency.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, a reflective sheet comprises a bottom part including a hole for exposing a light source, the bottom part provided on a bottom surface of a cover bottom; a lateral part extending from the bottom part, the lateral part provided at a lateral surface of the cover bottom; a half-cut pattern formed in the boundary between the bottom part and the lateral part; and a plurality of dot-cut patterns formed at the lateral part.

In another aspect, a method of manufacturing a reflective sheet, which has a bottom part arranged on a bottom surface of a cover bottom and a lateral part arranged at a lateral surface of the cover bottom, comprises forming a half-cut pattern in the boundary between the bottom part and the lateral part, forming a hole for exposing the bottom part in the bottom part, and forming a plurality of dot-cut patterns for adjusting an amount of reflected light in the lateral part by performing one punching process through the use of blade.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiments of the invention and together with the description serve to explain the principle of embodiments of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a reflective sheet according to the present invention and a backlight unit using the same will be described with reference to the accompanying drawings.

Figure 1:
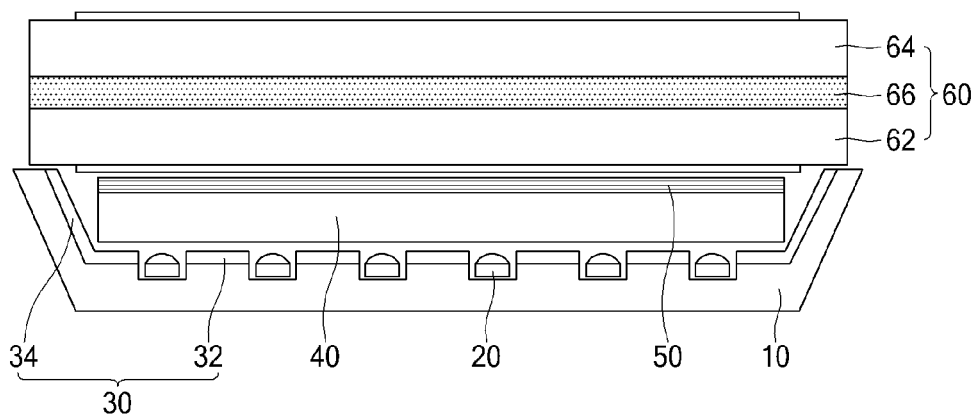
FIG. 1 illustrates a liquid crystal display device including a reflective sheet according to the related art.
Figure 2:
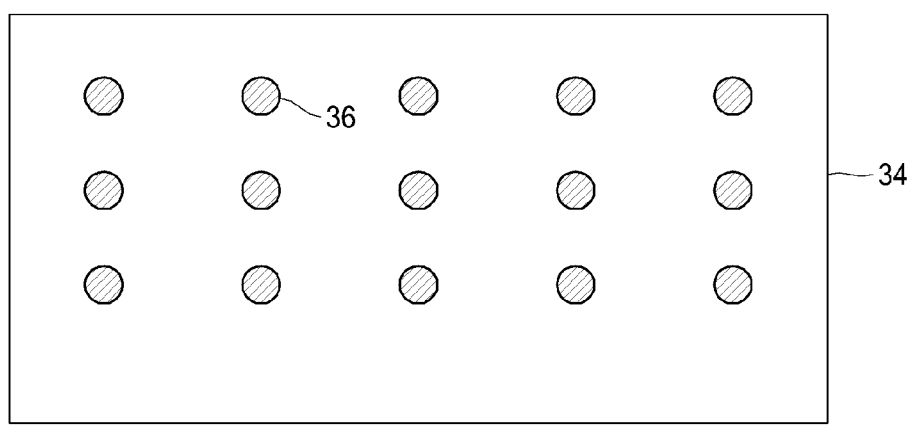
FIG. 2 illustrates an ink pattern formed at a lateral side of the related art reflective sheet shown in FIG. 1.
Figure 3:
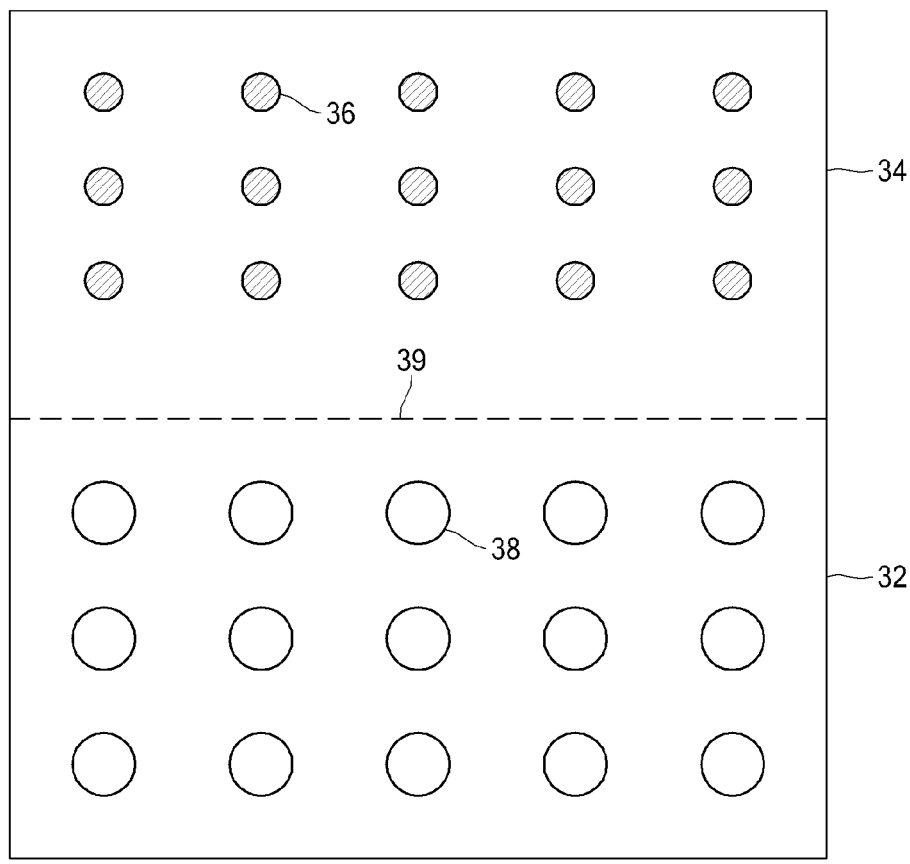
FIG. 3 illustrates a method of manufacturing the related art reflective sheet shown in FIG. 1.
Figure 4:
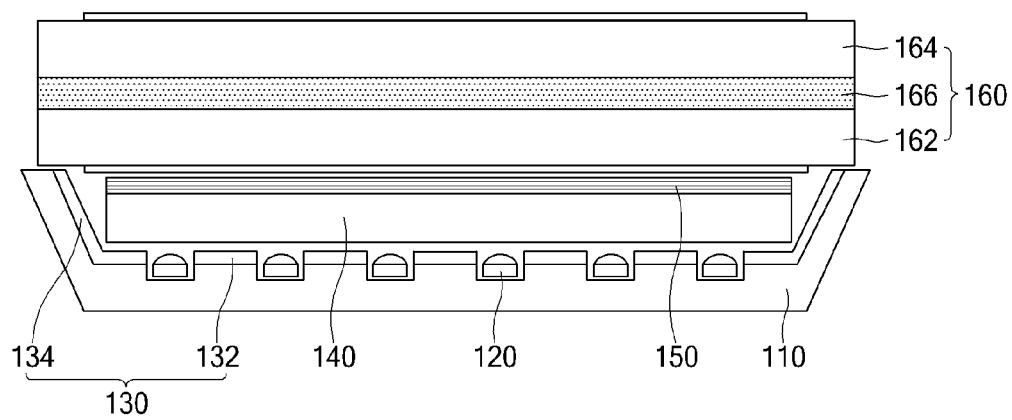
FIG. 4 illustrates a liquid crystal display device including a reflective sheet according to an embodiment of the present invention.

FIG. 4 illustrates a liquid crystal display device including a reflective sheet according to an embodiment of the present invention.

As shown in FIG. 4, the liquid crystal display device including the reflective sheet 130 may include a liquid crystal panel 160 provided with a plurality of pixels arranged in a matrix configuration, a backlight unit for supplying light to the liquid crystal panel 160, a cover bottom 110 for receiving the backlight unit therein, a top case (not shown), and a driving circuit (not shown) for driving the liquid crystal panel 160 and a light source of the backlight unit.

The backlight unit may be classified by an arrangement structure of the light source. That is, the backlight unit may be largely classified into a direct type and an edge type. In case of the direct type, the light source is positioned at a rear side of the liquid crystal panel 160. Meanwhile, in case of the edge type, the light source is positioned at a lateral side of the liquid crystal panel 160.

The liquid crystal panel 160 may include a lower substrate 162, an upper substrate 164, and a liquid crystal layer 166, wherein the liquid crystal layer 166 is interposed between the lower and upper substrates 162 and 164 bonded to each other. The liquid crystal panel 160 cannot emit light in itself, whereby the liquid crystal panel 160 needs the light source. In this case, the light emitted from the backlight unit including the light source positioned at a rear surface of the liquid crystal panel 160 is supplied to the liquid crystal panel 160. FIG. 4 shows a direct-type backlight unit in which a light source of light emitting diode (LED) 120 is used.

On the lower substrate 162 of the liquid crystal panel 160, there are a plurality of pixels arranged in a matrix configuration. On the upper substrate 164, there are red, green and blue color filters. Also, lower and upper polarizing films are respectively formed on lower and upper surfaces of the liquid crystal panel 160, wherein the lower and upper polarizing films selectively transmit or absorb the light by dividing a polarization of incident light.

Each pixel of the liquid crystal panel 160 is defined by crossing gate and data lines (not shown), and a thin film transistor (TFT) which functions as a switching element is formed in each pixel region defined by the gate and data lines.

When the thin film transistor (TFT) for each pixel is turned-on by a driving signal applied to the gate line, a data voltage applied to the data line is applied to a pixel electrode through a channel layer of the thin film transistor (TFT).

According to an electric field formed by a common voltage (Vcom) applied to a common electrode and the data voltage applied to the pixel electrode, liquid crystal molecules for each pixel are aligned so that a transmittance of the light supplied to the backlight unit is controlled, to thereby display an image.

The cover bottom 110 is formed to prepare a predetermined space in the inside including the bottom and lateral surfaces thereof. The backlight unit is provided inside the predetermined space prepared by the cover bottom 110.

The backlight unit may include a plurality of light emitting diodes (LED) 120 for generating the light, a reflective sheet 130, a diffusion plate 140, and a plurality of optical sheets 150.

The plurality of LEDs 120 and the reflective sheet 130 are arranged on the bottom of the cover bottom 110, and the diffusion plate 140 is arranged on the plurality of LEDs 120.

The plurality of optical sheets 150 for improving light efficiency are arranged on the diffusion plate 140. The plurality of optical sheets 150 may include a diffuser sheet, a prism sheet, and a reflective polarizing film (DBEF, Dual Brightness Enhancement Film).

The plurality of LEDs 120 may be provided in grooves formed on the bottom of the cover bottom 110, and may be arranged in an array type. The reflective sheet 130 is provided to reflect the light generated in the plurality of LEDs 120 toward the liquid crystal panel 160.

Figure 5:
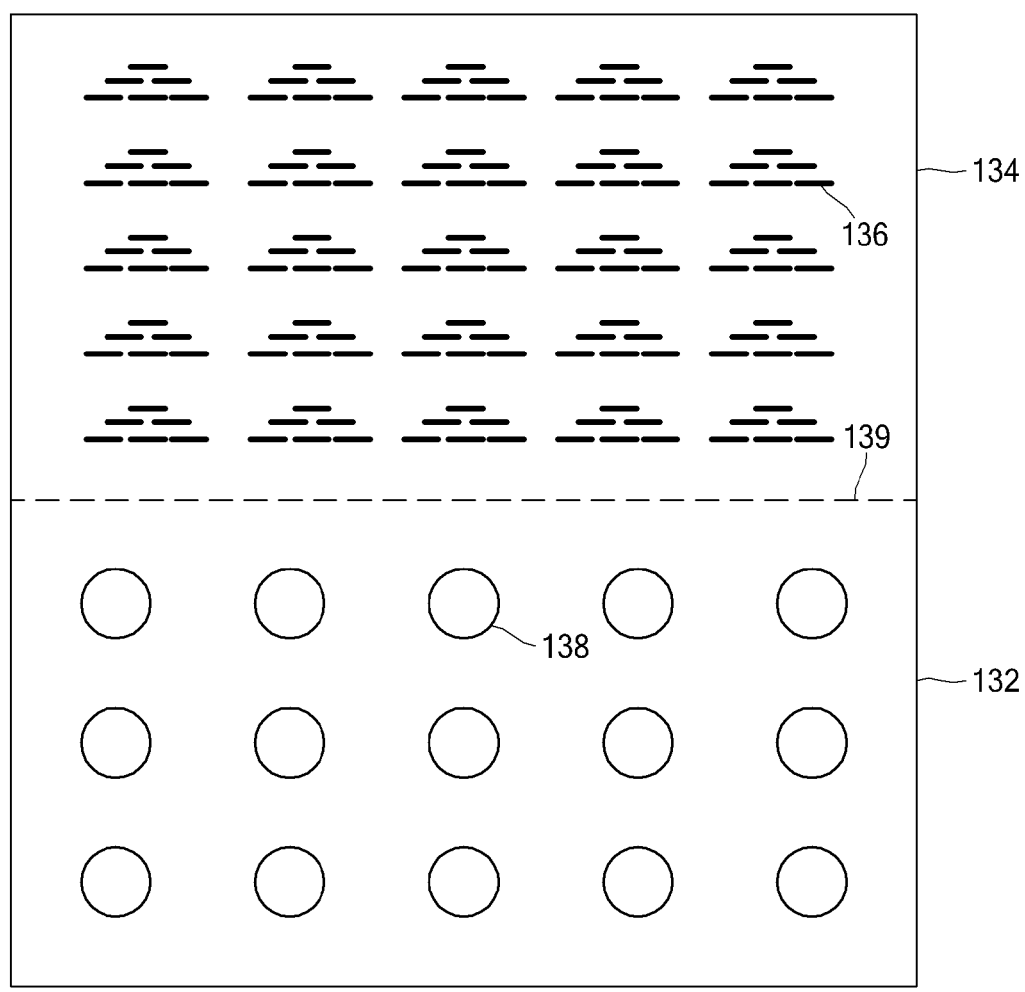
FIG. 5 illustrates the reflective sheet according to an embodiment of the present invention, and a method of manufacturing the reflective sheet according to an embodiment of the present invention.

FIG. 5 illustrates a method of manufacturing the reflective sheet according to an embodiment of the present invention.

With reference to FIG. 5, the reflective sheet 130 may include a first surface (bottom surface) 132 provided on the bottom of the cover bottom 110, and a second surface (lateral surface) 134 provided at a lateral side of the cover bottom 110.

The second surface (lateral surface) 134 extends from the first surface (bottom surface) 132. Also, a half-cut pattern 139 is formed in the boundary between the first surface (bottom surface) 132 and the second surface (lateral surface) 134 so that the reflective sheet 130 is bent along the profile of the cover bottom 110.

The first surface (bottom surface) 132 of the reflective sheet 130 is provided with a plurality of holes 138 for exposing the LEDs 120. The plurality of holes 138 may be formed in a punching process through the use of blade. The reflective sheet 130 is attached to the bottom and lateral surfaces of the cover bottom 110 so as to reflect the light generated in the LED 120 toward the liquid crystal panel 160.

To prevent both bright line and bright spot of the light generated in the LED 120, a plurality of dot-cut patterns 136 are formed on the second surface (lateral surface) 134 of the reflective sheet 130, that is, the lateral sidewall of the reflective sheet 130.

The plurality of dot-cut patterns 136 may be formed by punching the second surface (lateral surface) 134 of the reflective sheet 130 through the use of blade, wherein the plurality of dot-cut patterns 136 may be formed in one direction or various directions.

The plurality of dot-cut patterns 136 are formed on the second surface (lateral surface) 134 of the reflective sheet 130 so that it is possible to realize uniform luminance of the light reflected in the lateral direction of the cover bottom 110.

Also, the reflective sheet 130 is provided with a half-cut pattern 139 which enables to arrange the reflective sheet 130 along the profile of lateral surface of bottom surface of the cover bottom 110. The half-cut pattern 139 is formed in a punching process through the use of blade.

The reflective sheet 130 is bent by the half-cut pattern 139 so that the first surface (bottom surface) 132 is arranged on the bottom surface of the cover bottom 110. The second surface (lateral surface) 134 of the reflective sheet 130 is arranged at the lateral surface of the cover bottom 110.

During a process of manufacturing the reflective sheet 130, the half-cut pattern 139 is formed on the reflective sheet 130 so as to make the reflective sheet 130 be arranged along the profile of lateral surface and bottom surface of the cover bottom 110. The hole 138 for exposing the LED 120 is formed on the first surface (bottom surface) 132. The dot-cut pattern 136 is formed on the second surface (lateral surface) 134 so as to prevent bright line and bright spot. That is, the half-cut pattern 139, the hole 138 of the first surface (bottom surface) 132, and the dot-cut pattern 134 of the second surface (lateral surface) 132 may be formed together by one punching process.

The shape of dot-cut pattern for preventing bright line and bright spot is not limited. The amount of light reflected on the second surface (lateral surface) 134 of the reflective sheet 130 may be controlled by adjusting a density of dot-cut patterns 136.

For example, if trying to lower the luminance by decreasing the amount of reflected light, a density of dot-cut patterns 136 becomes high. Meanwhile, if trying to raise the luminance by increasing the amount of reflected light, a density of dot-cut patterns 136 becomes low.

In this case, if the dot-cut pattern 136 is formed in a solid-line shape, dust or foreign matter may permeate therethrough. Thus, it is the dot-cut pattern 136 may be formed in a dotted-line shape.

The amount of light reflected on the lateral surface of the cover bottom 110 may be controlled by adjusting the density of dot-cut patterns 136 formed on the second surface (lateral surface) 134 of the reflective sheet 130.

FIGS. 6 to 12 illustrate various example embodiments of dot-cut pattern formed at the lateral surface of the reflective sheet according to the present invention.

Figure 6:
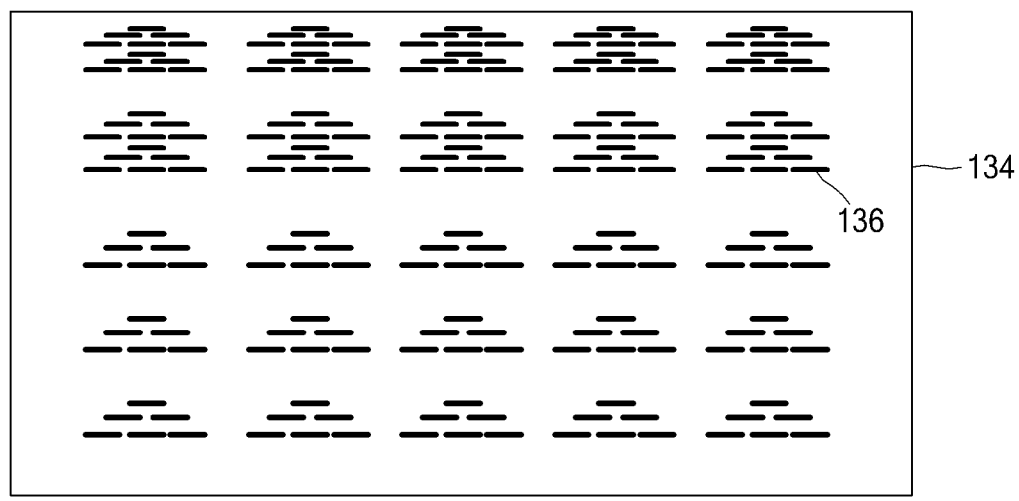
FIGS. 6 to 12 illustrate various example embodiments of dot-cut pattern formed at a lateral surface of the reflective sheet according to the present invention.

As shown in FIG. 6, the amount of light reflected on the lateral surface of the cover bottom 110 may be controlled by adjusting the density of dot-cut patterns 136 formed on the second surface (lateral surface) 134 of the reflective sheet 130.

For example, meanwhile the density of dot-cut patterns 136 is high in the upper area of the second surface (lateral surface) 134 of the reflective sheet 130, the density of dot-cut patterns 136 is low in the lower area of the second surface (lateral surface) 134 of the reflective sheet 130 so that it is possible to prevent the bright line and bright spot by adjusting the amount of reflected light in the lower and upper areas of the second surface (lateral surface) 134 of the reflective sheet 130.

Figure 7:
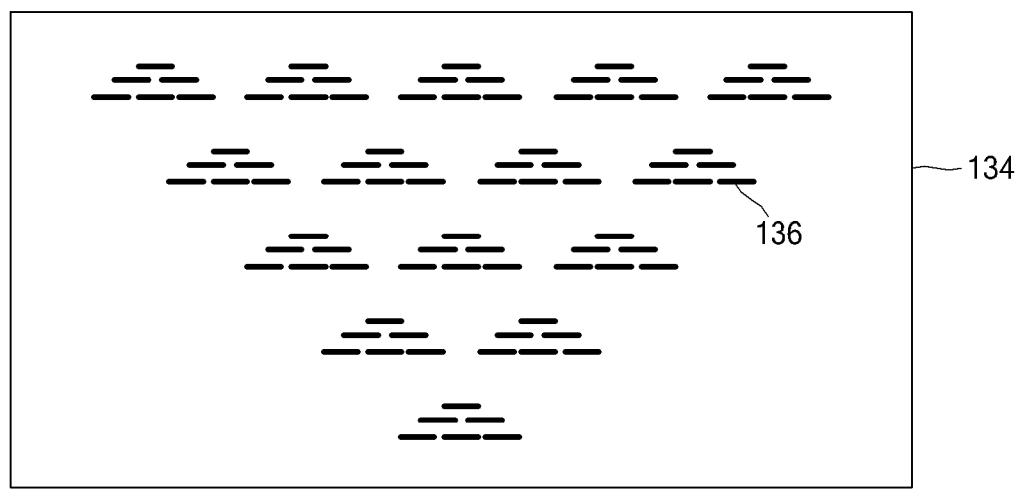

As shown in FIG. 7, the amount of light reflected on the lateral surface of the cover bottom 110 may be controlled by adjusting the density of dot-cut patterns 136 formed on the second surface (lateral surface) 134 of the reflective sheet 130.

For example, the density of dot-cut patterns 136 is gradually increased from the lower area of the second surface (lateral surface) 134 of the reflective sheet 130 to the upper area of the second surface (lateral surface) 134 of the reflective sheet 130. According as the amount of reflected light is gradually decreased from the lower area of the second surface (lateral surface) 134 of the reflective sheet 130 to the upper area thereof, it is possible to prevent the bright line and bright spot.

Figure 8:
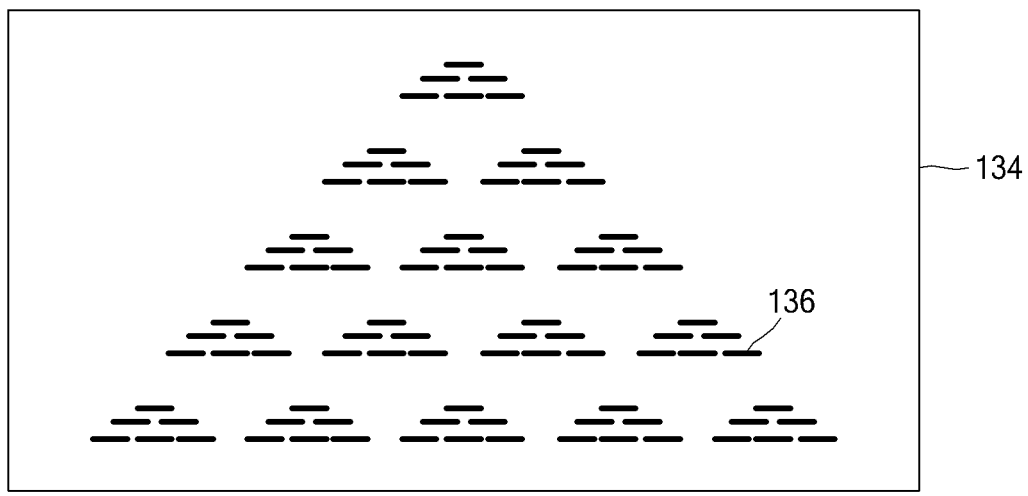

With reference to FIG. 8, the amount of light reflected on the lateral surface of the cover bottom 110 may be controlled by adjusting the density of dot-cut patterns 136 formed on the second surface (lateral surface) 134 of the reflective sheet 130.

For example, the density of dot-cut patterns 136 is gradually decreased from the lower area of the second surface (lateral surface) 134 of the reflective sheet 130 to the upper area of the second surface (lateral surface) 134 of the reflective sheet 130. According as the amount of reflected light is gradually increased from the lower area of the second surface (lateral surface) 134 of the reflective sheet 130 to the upper area thereof, it is possible to prevent the bright line and bright spot.

Figure 9:
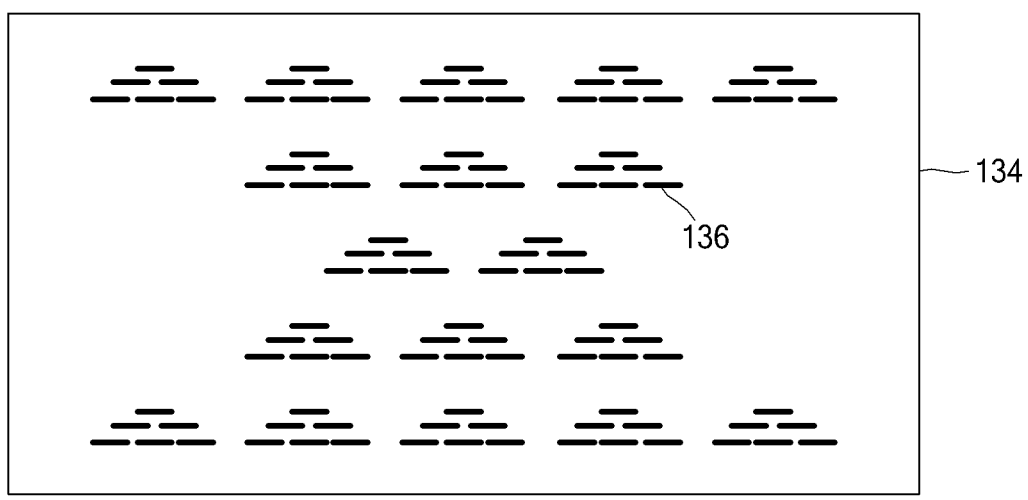

With reference to FIG. 9, the amount of light reflected on the lateral surface of the cover bottom 110 may be controlled by adjusting the density of dot-cut patterns 136 formed on the second surface (lateral surface) 134 of the reflective sheet 130.

For example, the density of dot-cut patterns 136 is gradually decreased from the lower area of the second surface (lateral surface) 134 of the reflective sheet 130 to the central area of the second surface (lateral surface) 134 of the reflective sheet 130. Also, the density of dot-cut patterns 136 is gradually decreased from the upper area of the second surface (lateral surface) 134 of the reflective sheet 130 to the central area of the second surface (lateral surface) 134 of the reflective sheet 130.

Accordingly, meanwhile the amount of reflected light is decreased in the upper and lower areas of the second surface (lateral surface) 134 of the reflective sheet 130, the amount of reflected light is increased in the central area of the second surface (lateral surface) 134 of the reflective sheet 130, to thereby prevent the bright line and bright spot by adjusting the amount of reflected light.

Figure 10:
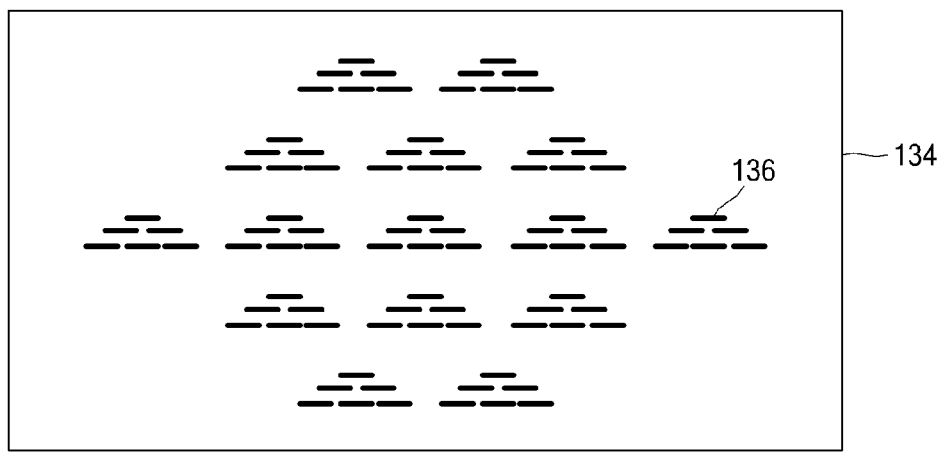

As shown in FIG. 10, the amount of light reflected on the lateral surface of the cover bottom 110 may be controlled by adjusting the density of dot-cut patterns 136 formed on the second surface (lateral surface) 134 of the reflective sheet 130.

For example, the density of dot-cut patterns 136 is gradually increased from the lower area of the second surface (lateral surface) 134 of the reflective sheet 130 to the central area of the second surface (lateral surface) 134 of the reflective sheet 130. Also, the density of dot-cut patterns 136 is gradually increased from the upper area of the second surface (lateral surface) 134 of the reflective sheet 130 to the central area of the second surface (lateral surface) 134 of the reflective sheet 130.

Accordingly, meanwhile the amount of reflected light is increased in the upper and lower areas of the second surface (lateral surface) 134 of the reflective sheet 130, the amount of reflected light is decreased in the central area of the second surface (lateral surface) 134 of the reflective sheet 130, to thereby prevent the bright line and bright spot by adjusting the amount of reflected light.

Figure 11:
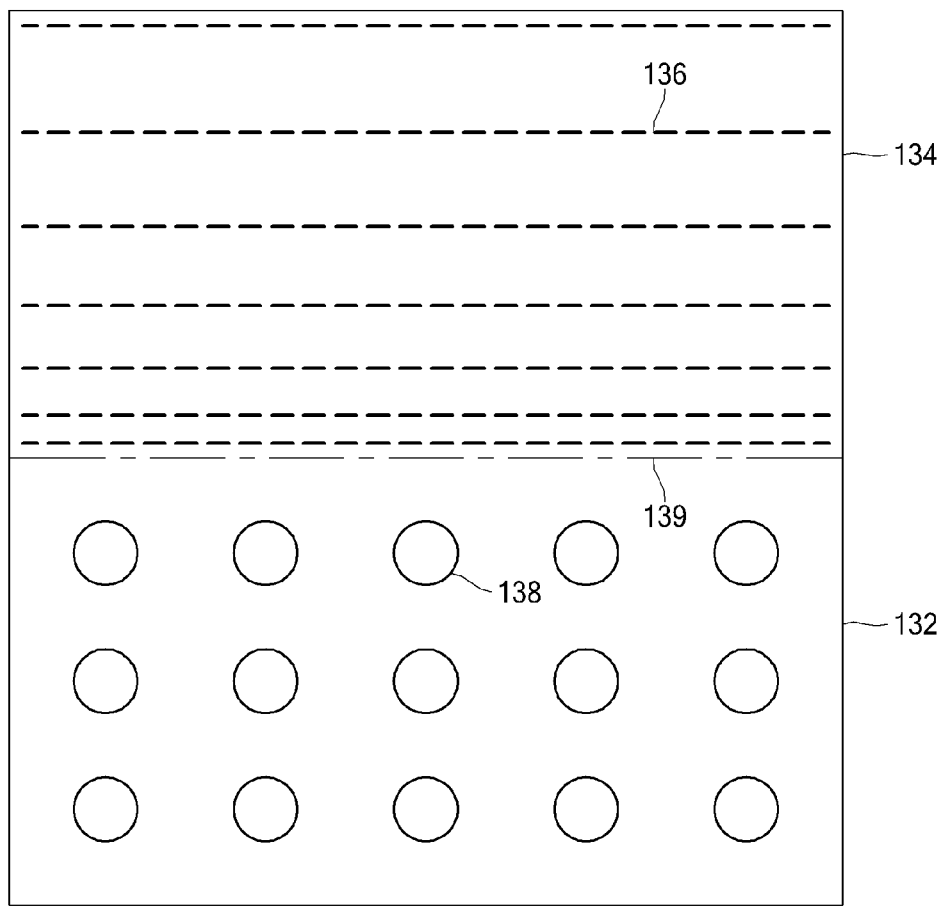

As shown in FIG. 11, the dot-cut pattern 136 is formed in a line shape, and is also provided in a horizontal direction of the second surface (lateral surface) 134 of the reflective sheet 130. In this case, the density of dot-cut patterns 136 is gradually decreased from the lower area of the second surface (lateral surface) 134 of the reflective sheet 130 to the upper area of the second surface (lateral surface) 134 of the reflective sheet 130.

According as the amount of reflected light is gradually increased from the lower area of the second surface (lateral surface) 134 of the reflective sheet 130 to the upper area thereof, it is possible to prevent the bright line and bright spot.

Figure 12:
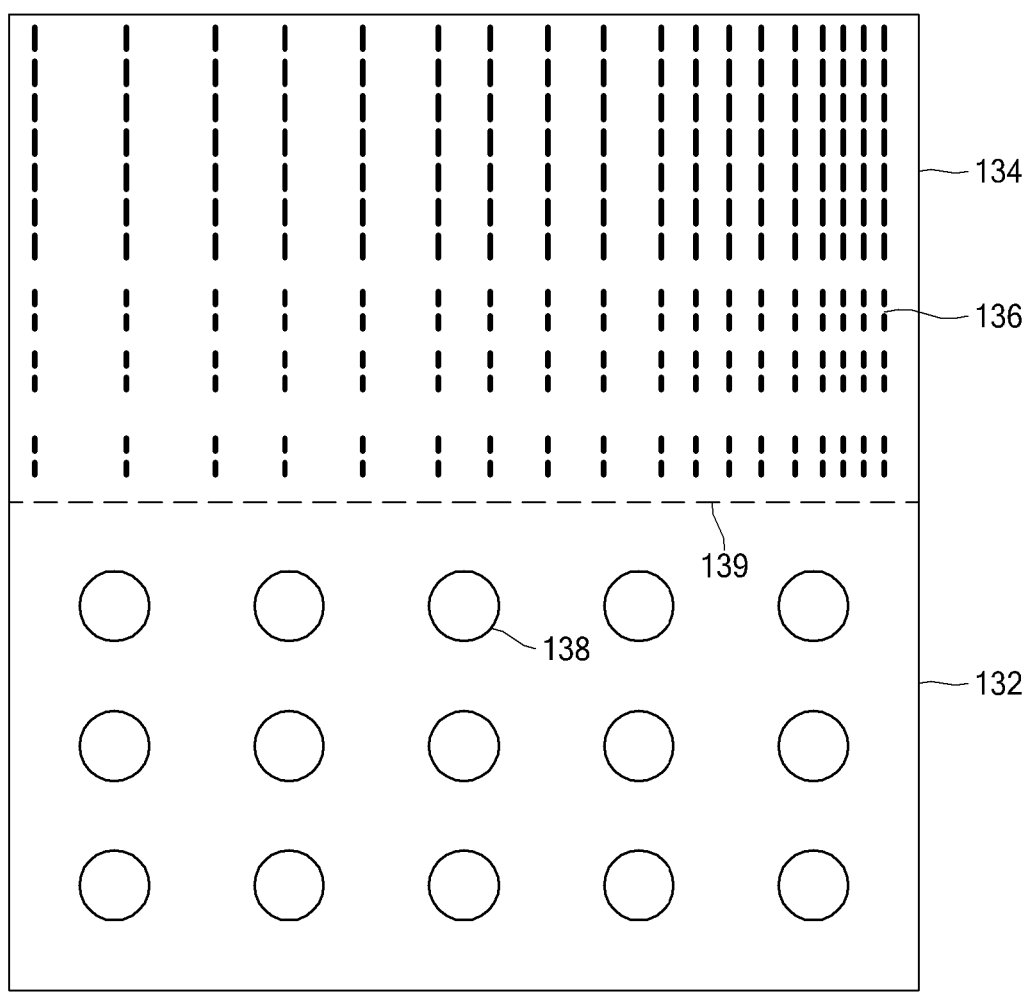

In FIG. 12, the dot-cut pattern 136 is formed in a line shape, and is also provided in a vertical direction of the second surface (lateral surface) 134 of the reflective sheet 130. The amount of light reflected on the lateral surface of the cover bottom 110 may be controlled by adjusting the density of dot-cut patterns 136.

The reflective sheet and the backlight unit using the same may supply the light with the uniform luminance to the liquid crystal panel 160, and thus improve the display quality of liquid crystal display device.

In the method of manufacturing the reflective sheet according to embodiments of the present invention, the half-cut pattern 139 is formed in the reflective sheet 130 by one punching process so that the reflective sheet 130 is arranged along the profile of lateral surface and bottom surface of the cover bottom 110. Also, the hole 138 for exposing the LED 120 is formed in the first surface (bottom surface) 132 of the reflective sheet 130, and the dot-cut pattern 136 for preventing the bright line and bright spot is formed in the second surface (lateral surface) 134 of the reflective sheet 130. Accordingly, it is possible to improve the manufacturing efficiency of the reflective sheet 130, and to reduce the manufacturing cost of the liquid crystal display device.

Further, it is possible to provide the reflective sheet which is capable of supplying light with uniform luminance to the liquid crystal panel, and the backlight unit using the same.

Also, it is possible to provide the reflective sheet which is capable of improving good picture quality of image displayed on the liquid crystal display device, and the backlight unit using the same.

Also, it is possible to provide the reflective sheet which is capable of reducing the manufacturing cost of the liquid crystal display device, and the backlight unit using the same.

In addition, it is possible to provide the reflective sheet which enables to improve the manufacturing efficiency.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A reflective sheet, comprising:
   a bottom part including an array of holes each for exposing a respective light source, the bottom part provided on a bottom surface of a cover bottom;
   a lateral part extending from the bottom part, the lateral part provided at a lateral surface of the cover bottom;
   a half-cut pattern formed parallel to a row of holes of the array and extending along an entire length of the row at the boundary between the bottom part and the lateral part; and
   a plurality of dot-cut patterns formed at the lateral part, the dot-cut patterns having a dotted line shape parallel to the half-cut pattern with each dot-cut of the dot-cut patterns having an elongated shape defining a long axis parallel to the half-cut pattern,
   wherein the dot-cut patterns are composed of a plurality of groups, each group including a plurality of rows of dot cuts parallel to the half-cut pattern, wherein a first row of each group includes a plurality of dot-cuts having a dotted line shape such that a spacing between adjacent ones of the dot-cuts in the first row is less than a spacing between adjacent groups, wherein the number of the dot-cuts in the first row of each group is more than the number of the dot-cuts in a second row of each group, and wherein the plurality of dot-cut patterns are formed in a horizontal direction such that each group defines a triangular shape.

2. The reflective sheet according to claim 1, wherein luminance of light reflected on the lateral part is lowered by increasing a density of dot-cut patterns, and luminance of light reflected on the lateral part is increased by decreasing a density of dot-cut patterns.

3. The reflective sheet according to claim 1, wherein a density of dot-cut patterns in an upper area of the lateral part is high, and a density of dot-cut patterns in a lower area of the lateral part is low.

4. The reflective sheet according to claim 1, wherein a density of dot-cut patterns is gradually increased from a lower area of the lateral part to an upper area of the lateral part.

5. The reflective sheet according to claim 1, wherein a density of dot-cut patterns is gradually lowered from a lower area of the lateral part to an upper area of the lateral part.

6. The reflective sheet according to claim 1, wherein a density of dot-cut patterns is gradually decreased from a lower area of the lateral part to a central area of the lateral part, and a density of dot-cut patterns is gradually decreased from an upper area of the lateral part to the central area of the lateral part.

7. The reflective sheet according to claim 1, wherein a density of dot-cut patterns is gradually increased from a lower area of the lateral part to a central area of the lateral part, and a density of dot-cut patterns is gradually increased from an upper area of the lateral part to the central area of the lateral part.

8. The reflective sheet according to claim 1, wherein a half-cut pattern includes a plurality of half-cut patterns in a dotted line shape formed in a line parallel to the row of holes of the array and extending along the entire length of the row at the boundary between the bottom part and the lateral part.

9. A display device, comprising:
a liquid crystal panel provided with a plurality of pixels arranged in a matrix configuration;
a backlight unit for supplying light to the liquid crystal panel;
a cover bottom for receiving the backlight unit therein; and
a driving circuit for driving the liquid crystal panel and a light source of the backlight unit,
wherein the backlight unit includes a reflective sheet including a bottom part including an array of holes each for exposing a respective light source, the bottom part provided on a bottom surface of a cover bottom, a lateral part extending from the bottom part, the lateral part provided at a lateral surface of the cover bottom, a half-cut pattern formed parallel to a row of holes of the array and extending along an entire length of the row at the boundary between the bottom part and the lateral part, and a plurality of dot-cut patterns formed at the lateral part, the dot-cut patterns having a dotted line shape parallel to the half-cut pattern with each dot-cut of the dot-cut patterns having an elongated shape defining a long axis parallel to the half-cut pattern,
wherein the dot-cut patterns are composed of a plurality of groups, each group including a plurality of rows of dot cuts parallel to the half-cut pattern,
wherein a first row of each group includes a plurality of dot-cuts having a dotted line shape such that a spacing between adjacent ones of the dot-cuts in the first row is less than a spacing between adjacent groups,
wherein the number of the dot-cuts in the first row of each group is more than the number of the dot-cuts in a second row of each group, and
wherein the plurality of dot-cut patterns are formed in a horizontal direction such that each group defines a triangular shape.

10. The display device according to claim 9, wherein a half-cut pattern includes a plurality of half-cuts in a dotted line shape formed in a line parallel to the row of holes of the array and extending along the entire length of the row at the boundary between the bottom part and the lateral part.

* * * * *